US008584576B2

(12) United States Patent
Fogg, IV

(10) Patent No.: US 8,584,576 B2
(45) Date of Patent: *Nov. 19, 2013

(54) PORTABLE AUTOMATIC BEVERAGE BREWING DRINKING VESSEL

(76) Inventor: Leslie William Fogg, IV, South Burlington, VT (US)

(*) Notice: Subject to any disclaimer, the term of this patent is extended or adjusted under 35 U.S.C. 154(b) by 255 days.

This patent is subject to a terminal disclaimer.

(21) Appl. No.: 12/924,346

(22) Filed: Sep. 24, 2010

(65) Prior Publication Data

US 2011/0072979 A1    Mar. 31, 2011

Related U.S. Application Data

(63) Continuation-in-part of application No. 12/586,773, filed on Sep. 28, 2009, now abandoned.

(51) Int. Cl.
*A47J 31/44* (2006.01)

(52) U.S. Cl.
USPC ............... 99/288; 99/275; 99/280; 99/287; 99/295; 99/299; 99/300; 99/303; 99/305; 99/306; 99/307; 99/315; 99/316; 99/318; 99/320; 99/321; 99/327

(58) Field of Classification Search
CPC ..... A47J 31/20; A47J 36/2466; A47J 31/005; A47J 31/44; A47J 31/46
USPC ............ 99/295, 280, 287, 299, 300, 303, 99/305–307, 315, 316, 318, 320–322, 327, 99/275; 432/138, 141, 142
See application file for complete search history.

(56) References Cited

U.S. PATENT DOCUMENTS

| 1,887,848 | A | * | 11/1932 | Peirce | 99/282 |
|---|---|---|---|---|---|
| 2,302,698 | A | * | 11/1942 | Kessel | 422/552 |
| 3,158,084 | A | * | 11/1964 | Cohn | 99/297 |
| 3,665,841 | A | * | 5/1972 | Hardy et al. | 99/281 |
| 3,725,643 | A | * | 4/1973 | Clausse | 219/441 |
| 3,955,485 | A | * | 5/1976 | Stasse | 99/287 |
| 4,401,014 | A | * | 8/1983 | McGrail et al. | 99/283 |
| 4,627,334 | A | * | 12/1986 | Shanklin | 99/306 |
| 4,980,539 | A | * | 12/1990 | Walton | 219/432 |
| 5,027,696 | A | * | 7/1991 | Antonini | 99/279 |
| 5,046,409 | A | * | 9/1991 | Henn | 99/307 |
| 5,112,629 | A | * | 5/1992 | Antonini | 426/231 |
| 5,440,972 | A | * | 8/1995 | English | 99/282 |
| 5,478,586 | A | * | 12/1995 | Connor | 426/431 |
| 5,531,353 | A | * | 7/1996 | Ward et al. | 220/729 |
| 5,609,092 | A | * | 3/1997 | Chen | 99/319 |
| 5,635,233 | A | * | 6/1997 | Levinson | 426/433 |
| 5,680,108 | A | * | 10/1997 | Daniell et al. | 340/603 |
| 5,738,786 | A | * | 4/1998 | Winnington-Ingram | 210/474 |

(Continued)

FOREIGN PATENT DOCUMENTS

WO    WO 2008049163 A1 * 5/2008 ............. A47J 31/20

*Primary Examiner* — Henry Yuen
*Assistant Examiner* — Brett Spurlock

(57) ABSTRACT

A portable automatic beverage brewing drinking vessel comprising, an on/off button, a heating element, a receptacle for accepting infusible material, and a means for translating the receptacle through the liquid. The means for translating the receptacle through the liquid includes but is not limited to, an electric motor, and magnets or electromagnets. In one embodiment, a pump transfers the liquid through tubes to the receptacle. The brewing vessel is portable and provides a simple and automatic means for brewing a beverage that can be consumed directly from the vessel.

11 Claims, 13 Drawing Sheets

(56) References Cited

U.S. PATENT DOCUMENTS

| | | | | |
|---|---|---|---|---|
| 5,809,867 A | * | 9/1998 | Turner et al. | 99/297 |
| 5,862,739 A | * | 1/1999 | Lin | 99/285 |
| 5,887,510 A | * | 3/1999 | Porter | 99/287 |
| 6,037,570 A | * | 3/2000 | Noles | 219/432 |
| 6,062,127 A | * | 5/2000 | Klosinski et al. | 99/303 |
| 6,065,609 A | * | 5/2000 | Lake | 210/474 |
| 6,084,216 A | * | 7/2000 | Slegt et al. | 219/497 |
| 6,135,010 A | * | 10/2000 | Husted et al. | 99/319 |
| 6,240,833 B1 | * | 6/2001 | Sham et al. | 99/297 |
| 6,272,974 B1 | * | 8/2001 | Pascotti et al. | 99/318 |
| 6,405,638 B1 | * | 6/2002 | Chen | 99/318 |
| 6,422,133 B1 | * | 7/2002 | Brady | 99/297 |
| 6,622,614 B1 | * | 9/2003 | Smith | 99/284 |
| 6,844,015 B2 | * | 1/2005 | Yuguchi | 426/78 |
| 6,915,733 B1 | * | 7/2005 | Langbauer | 99/319 |
| 7,032,507 B2 | * | 4/2006 | Cai | 99/323 |
| 7,040,218 B1 | * | 5/2006 | Biolchini, Jr. | 99/297 |
| 7,093,531 B2 | * | 8/2006 | Tardif | 99/297 |
| 7,194,951 B1 | * | 3/2007 | Porter | 100/116 |
| 7,219,600 B1 | * | 5/2007 | Haven et al. | 99/318 |
| 7,250,587 B2 | * | 7/2007 | Ely et al. | 219/386 |
| 7,279,660 B2 | * | 10/2007 | Long et al. | 219/441 |
| 8,069,775 B2 | * | 12/2011 | Russo | 99/303 |
| 2005/0268790 A1 | * | 12/2005 | Baldacci | 99/285 |
| 2005/0284303 A1 | * | 12/2005 | Zell et al. | 99/279 |
| 2006/0021511 A1 | * | 2/2006 | Paasch et al. | 99/275 |
| 2007/0068395 A1 | * | 3/2007 | Masek et al. | 99/295 |
| 2007/0101868 A1 | * | 5/2007 | Porter | 99/275 |
| 2007/0151466 A1 | * | 7/2007 | Clark et al. | 99/467 |
| 2007/0221067 A1 | * | 9/2007 | Scelza | 99/279 |
| 2007/0221068 A1 | * | 9/2007 | Boussemart et al. | 99/279 |
| 2008/0274246 A1 | * | 11/2008 | Glucksman et al. | 426/425 |
| 2010/0018403 A1 | * | 1/2010 | Hoare et al. | 99/281 |

* cited by examiner

PORTABLE AUTOMATIC BEVERAGE BREWING DRINKING VESSEL

RELATED APPLICATIONS

The present application is a continuation in part application of U.S. patent application Ser. No. 12/586,773 filed Sep. 28, 2009.

FIELD OF THE INVENTION

The present invention relates to drinking vessels, and more specifically to an automatic portable beverage brewing drinking vessel for preparing a single serving of hot beverages such as coffee or tea.

BACKGROUND OF THE INVENTION

Portable single serving drinking vessels for hot beverages such as coffee or tea provide numerous advantages over multi-cup beverage brewing devices. The portable aspect of a single cup brewing drinking vessel allows for the preparation and enjoyment of a hot beverage in any environment, including but not limited to when traveling, camping, in the office, or when at home. In addition, the single serving portion of a portable single cup drinking vessel allows for the quick preparation of an amount of beverage that is appropriate for one person. Preparing a single serving in a multi-cup beverage brewing devices often results in the disposal of unused portions of the beverage, which equates to a waste of materials, energy to keep the beverage warm, and money. Another advantage of the portable single cup drinking vessel is cleanliness and the elimination of bacterial or viral exposure associated with the preparation and handling of most communal multi-beverage brewing devices.

There have been a number of approaches to meet the needs of a single serving beverage brewing and drinking vessel but there exists a need for an automatic, easy to use portable device. A simple single serving beverage brewing device is described in U.S. Pat. No. 5,478,586 issued to Conner, and describes generally a French press, or a device that holds a quantity of infusible material and has a means to plunge the infusible material through the liquid. This device fails to provide a means to heat the liquid, requires the user to deal with loose quantities of infusible material, and is not designed to drink from.

In U.S. Pat. No. 6,065,609 issued to Lake, a beverage brewing kit is described that comprises a cup and a cylindrical filter support for receiving infusible material. Again, this invention fails to provide a means to heat the liquid, and requires the user to deal with loose quantities of infusible material, has multiple large parts and is not portable.

Therefore, there exists a need for a portable automatic beverage brewing device that heats a liquid and automatically brews a beverage, and is designed to drink directly from.

SUMMARY OF THE INVENTION

The invention is a portable automatic beverage brewing drinking vessel having a receptacle for receiving a quantity of infusible material and a means for translating the infusible material into the liquid. In addition, the automatic beverage brewing dinking vessel heats cold liquid to a predetermined temperature before translating the infusible material into the liquid, providing a consistent beverage quality. In one embodiment, the interior wall of the automatic beverage brewing drinking vessel has channels that align with locating elements on the receptacle for receiving infusible material and guide the receptacle as it is translated into and out of the liquid.

Accordingly, it is a principle object and purpose of the present invention to provide a portable automatic beverage brewing drinking vessel for hot beverages such as coffee or tea.

It is a further object and purpose of the present invention to provide a portable automatic beverage brewing drinking vessel having a receptacle for receiving a quantity of infusible material.

It is further object and purpose of the present invention to provide a portable automatic beverage brewing drinking vessel having an automatic brewing program that heats the liquid to a predetermined temperature, and automatically translates the infusible material into the liquid.

It is a further object and purpose of the present invention to provide a portable automatic beverage drinking vessel having a means to transfer the liquid through the infusible material.

It is yet another object and purpose of the present invention to provide a portable automatic beverage drinking vessel designed for the consumption of a beverage directly there from.

Further objects of the invention will be apparent from the following drawings and detailed description, thereof.

BRIEF DESCRIPTION OF THE FIGURES

The operation of the present invention should become apparent from the following description when considered in conjunction with the accompanying drawings, in which.

Each item number used to indicate a particular feature or element in the figures is used consistently throughout all figures, however, not all features in each figure are referred to in the description.

DETAILED DESCRIPTION OF THE INVENTION

Figure 1:
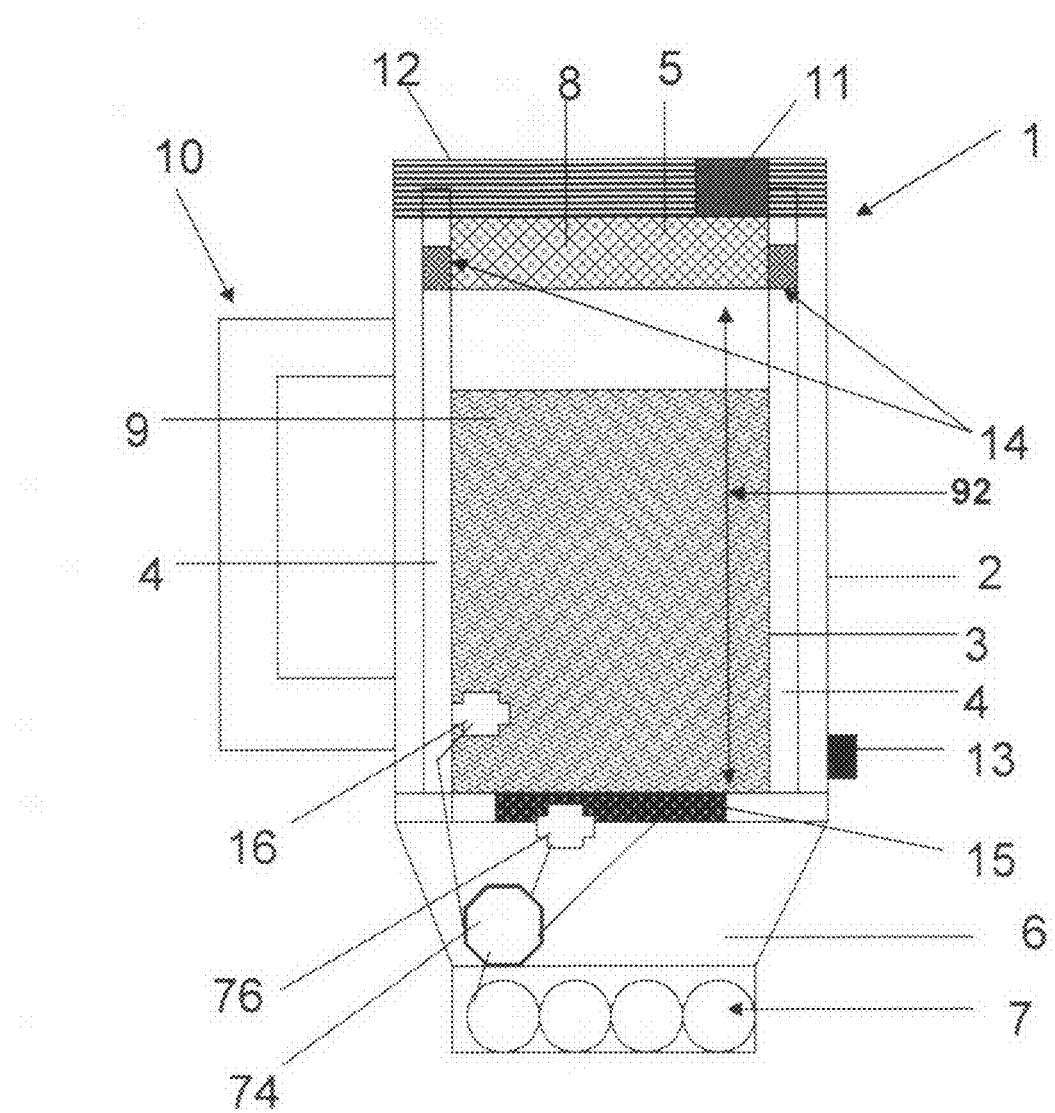
FIG. 1 is a cross sectional side view of the portable automatic beverage brewing drinking vessel having a receptacle for receiving infusible material, and batteries in the base.

The portable automatic beverage brewing drinking vessel depicted in FIG. 1 comprises a drinking vessel 1 having and exterior wall 2 and interior wall 3 and channels 4 for guiding receptacle 5. In one embodiment, the channels 4 extend from the top portion of the drinking vessel, to the beginning of the base 6 as depicted in FIG. 1. In another embodiment, the channels only extend a portion of the length along the drinking vessel. As depicted in FIG. 1, there are two channels 4 but in other embodiments of the invention, there may be only one channel or multiple channels. The drinking vessel 1 in FIG. 1 has batteries 7 in the base 6 that are the power supply. The batteries could be any type of battery sufficient to provide enough energy to operate the device, including but not limited to heating the liquid, operating the mechanism for translating the infusible material into the liquid, and operating the control system. The drinking vessel also has a controller 74, as depicted in FIG. 1, that is connected to the power source 7 and receives input from sensing elements and controls the activation, timing and general operation of the device. The automatic beverage brewing drinking vessel 1 as depicted in FIG. 1 further comprises a handle 10, a drinking port 11 in the lid 12, and an on/off button 13. In addition, the liquid 9 is heated to a predetermined temperature by the heating element 15 that is connected to a temperature sensor 16, as depicted in FIG. 1.

Figure 2:
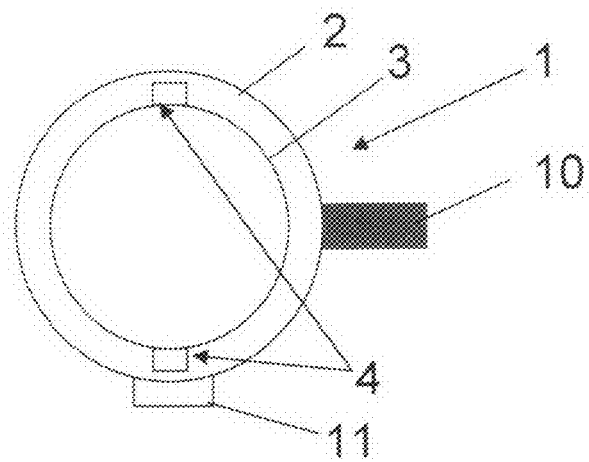
FIG. 2 is a top down view of the portable automatic beverage brewing drinking vessel.
Figure 3:
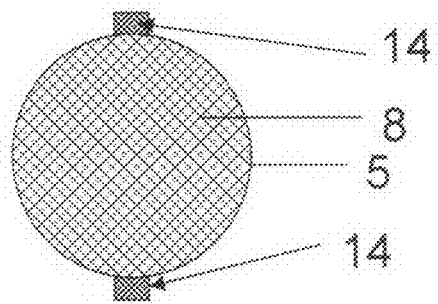
FIG. 3 is a top down view of the infusible material receptacle.
Figure 4:
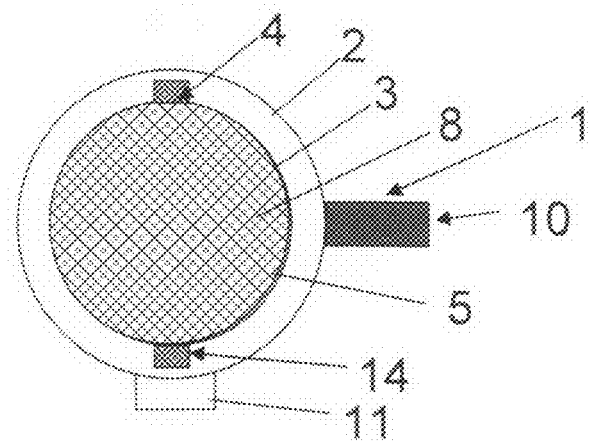
FIG. 4 is a top down view of the infusible material receptacle in the portable automatic beverage brewing drinking vessel.
Figure 12:
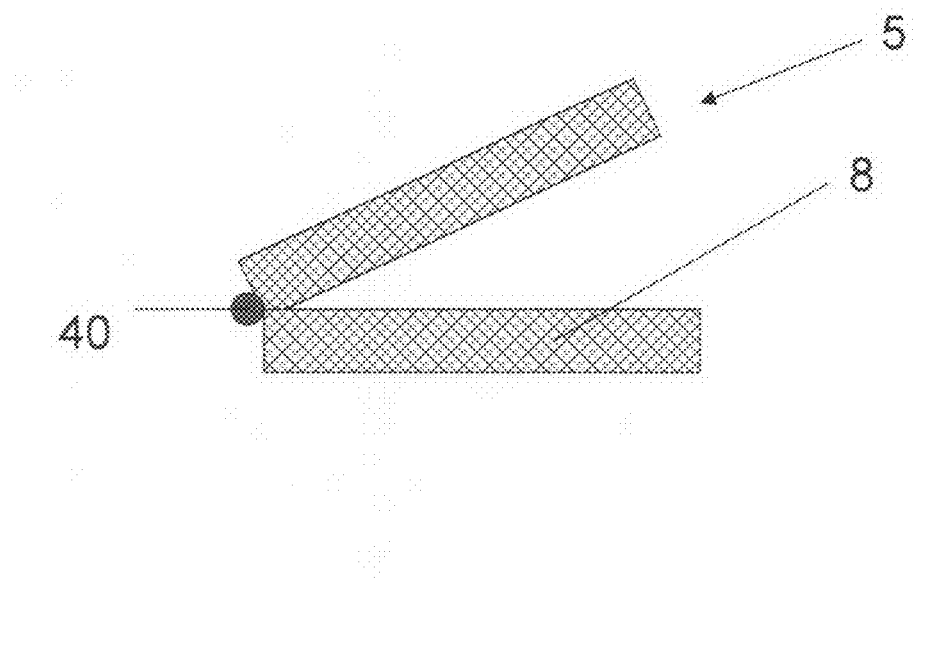
FIG. 12 is side view of a receptacle for receiving infusible material having a hinged element for opening.

The alignment of the channels 4 with the receptacle guiding elements 14 is depicted in FIG. 2 through FIG. 4, for one embodiment of the invention. FIG. 2 is a top down view of a drinking vessel 1, and the channels 4 are depicted as being positioned across from each other. FIG. 3 shows a receptacle 5 and guiding elements 14. FIG. 4 depicts how channels 4 of the drinking vessel 1 align with the guiding elements 14 of the receptacle 5. The receptacle 5, as shown in FIG. 12, is made of two parts to hold the infusible material 8 and has a hinge 40. In one embodiment, the two parts of the receptacle are hinged. In another embodiment the two parts are configured to snap together or connect to each other through any other conventional means including but not limited to an interference fit snap, or a pin and groove configuration, a threaded configuration that allows the two pieces to be screwed together, and the like. In yet another embodiment the receptacle consist of only one part that sufficiently retains the infusible material.

Figure 5:
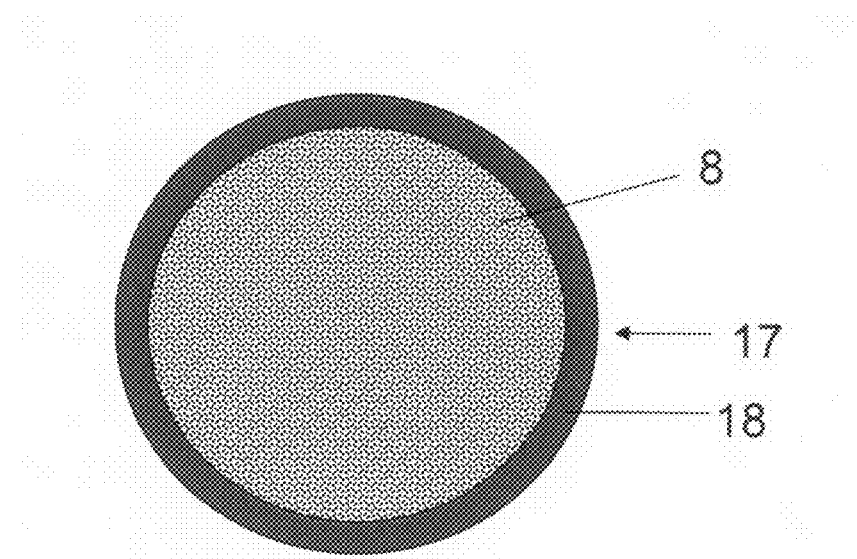
FIG. 5 is a top down view of an infusible material package having a sealed edge.

FIG. 5 depicts a package of infusible material 8 in a pouch 17 with a sealed edge 18. The infusible material may be coffee grounds, tea, kava kava, mint, or any other material that allows for the extraction of flavors when contacted with water. The pouch is typically made of a material that is porous and allows for the passage of water, while retaining the infusible material inside. In some embodiments at least a portion of the infusible material passes through the pouch.

Figure 6:
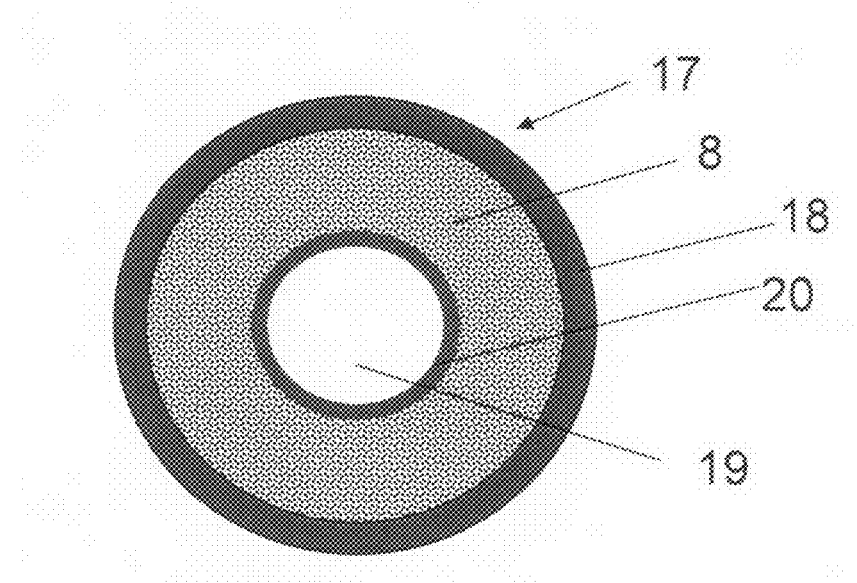
FIG. 6 is a top down view of a ring shaped infusible material package having an outer sealed edge and an inner sealed edge and an opening in the center.

FIG. 6 is another embodiment of a package of infusible material 8 in a pouch 17. The pouch 17 as depicted in FIG. 6 has an outer sealed edge 18, an inner sealed edge 20, and an opening 19 in the center of the pouch. In one embodiment the opening 19 is a circle. In another embodiment the opening is rectangular. Any shape opening may be used to facilitate location of the pouch within the receptacle.

Figure 7:
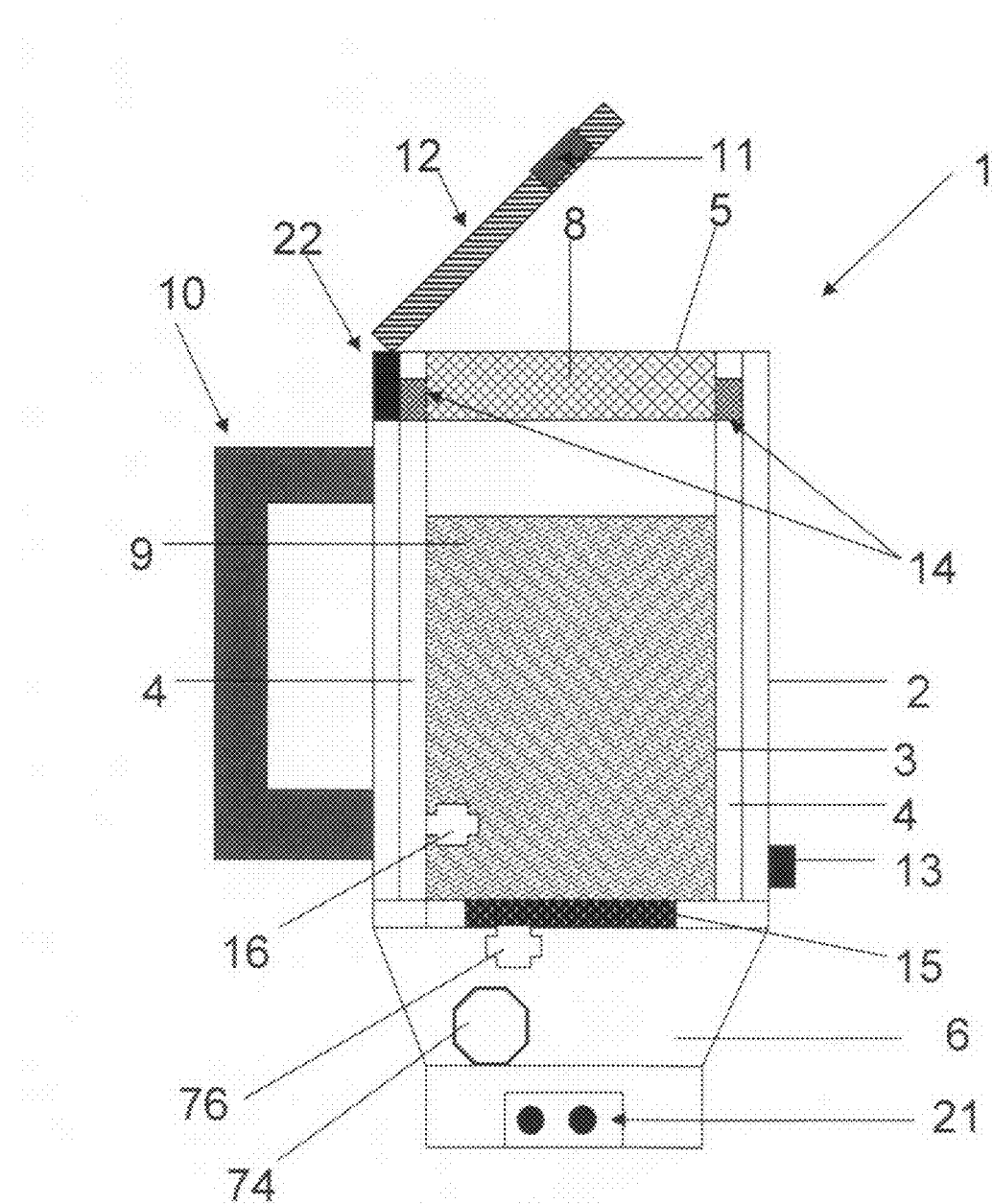
FIG. 7 is a cross sectional side view of the portable automatic beverage brewing drinking vessel having a receptacle for receiving infusible material, and an electric port.

FIG. 7 depicts the portable automatic beverage brewing drinking vessel 1 comprising an electrical connection port 21 type power supply. The electrical connection port allows for the portable automatic beverage brewing drinking vessel to be operated by connection to an electrical power supply, such as through an electric cord. The electric connection port may also be used to recharge a battery in the portable automatic beverage brewing drinking vessel, wherein the battery would act as the power supply. The connection port may be configured to receive power through any conventional power cord including but not limited to a wall outlet, an automobile electric output, such as a cigarette lighter and the like. In one embodiment, a multi cell Lithium Ion battery or (LiPo) battery is used to power the device. In another embodiment, the battery is made to be easily removed from the device so that the user can remove the battery after the brewing process in complete in order to reduce the weight of the device.

FIG. 7 further depicts the portable automatic beverage brewing drinking vessel 1 having a lid 12 attached to a hinge 22 for easy removal of the infusible material 8. In addition, a drinking port 11 is depicted in FIG. 7 as a hole in the lid. In another embodiment, the drinking port 11 may be a raised element from the side of the drinking vessel 1 as depicted in FIG. 8.

Figure 8:
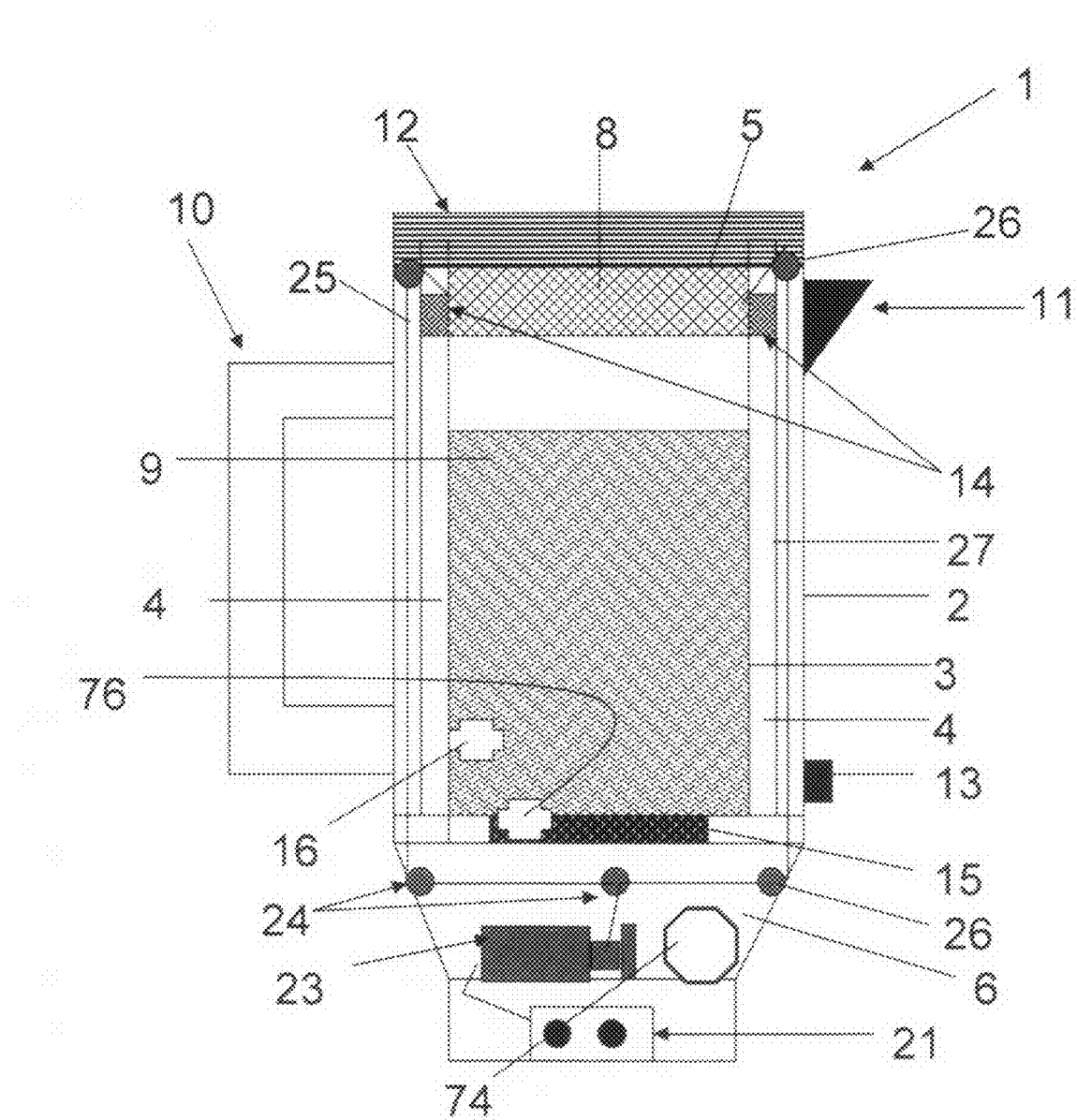
FIG. 8 is a cross sectional side view of the portable automatic beverage brewing drinking vessel having a receptacle for receiving infusible material, and an electric motor to translate the receptacle into and out of the liquid.

FIG. 8 depicts the portable automatic beverage brewing drinking vessel 1 comprising an electric motor 23 and a linking mechanism 24 to translate the receptacle 5 into the liquid 9. In FIG. 8, the electric motor 23 is depicted as being in the base 6. Without limiting the design of the linking mechanism, the linking mechanism may be comprised of any conventional elements including but not limited to wires, gears, chains, guide loops, guide channels, pulley and the like. In one embodiment, the electric motor is connected to a wire 25 or wires, and these wires are connected to the receptacle 5 and run through guide loops 26, as depicted in FIG. 8. In another embodiment, the wires may run through guide channels that are part of the portable automatic beverage brewing drinking vessel. In one embodiment, liquid seals 27 are incorporated along the inner edge of the alignment channels 4, as depicted in FIG. 8.

Figure 9:
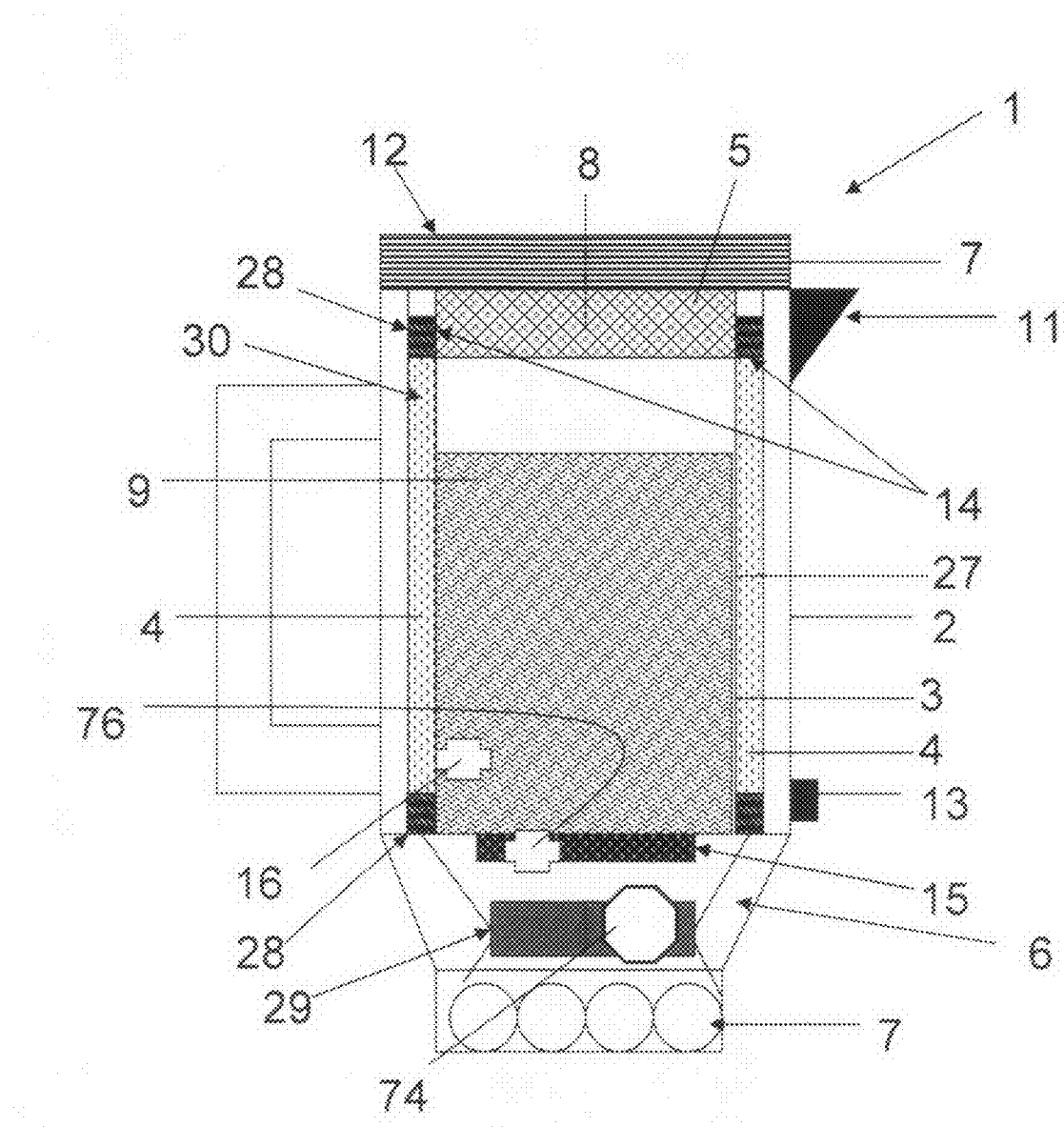
FIG. 9 is a cross sectional side view of the portable automatic beverage brewing drinking vessel having a receptacle for receiving infusible material, and electromagnets to translate the receptacle into and out of the liquid.

FIG. 9 depicts the portable automatic beverage brewing drinking vessel 1 comprising electromagnets 28 to translate the receptacle 5 into and out of the liquid 9. In this embodiment, the electromagnets are activated through the timing device 29 to cause the receptacle to move down through the liquid after the liquid reaches the preset temperature. A dampener 30 may be used to further control the rate of motion of the receptacle 5 as it moves though the liquid 9, as depicted in FIG. 9. In one embodiment, the electromagnets are only in the base of the portable automatic beverage brewing drinking vessel, and magnets are located in the receptacle.

Figure 10A:
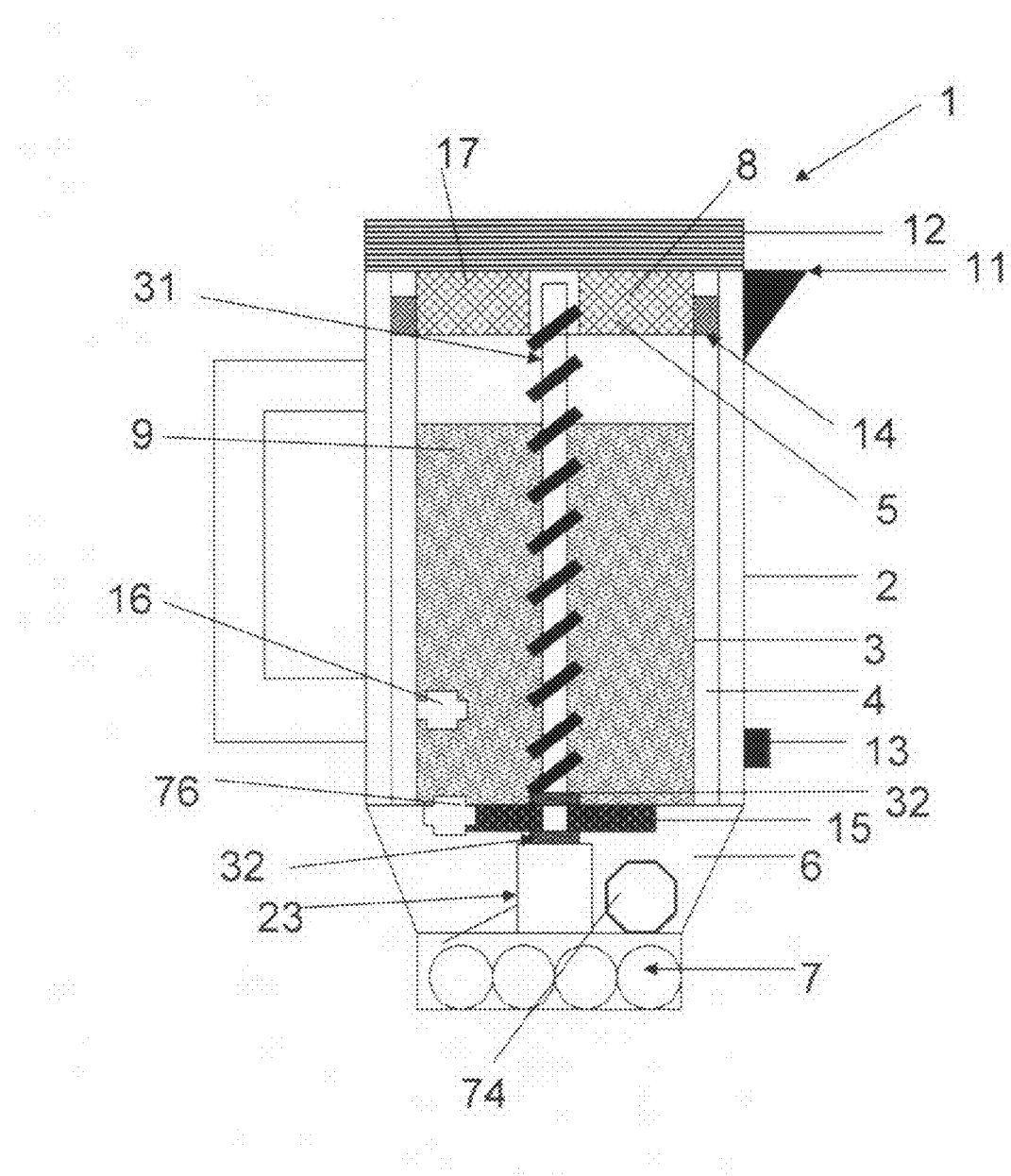
FIG. 10A is a cross sectional side view of the portable automatic beverage brewing drinking vessel having a receptacle for receiving infusible material, an electric motor connected to a threaded center shaft to translate the receptacle into and out of the liquid.
Figure 10B:
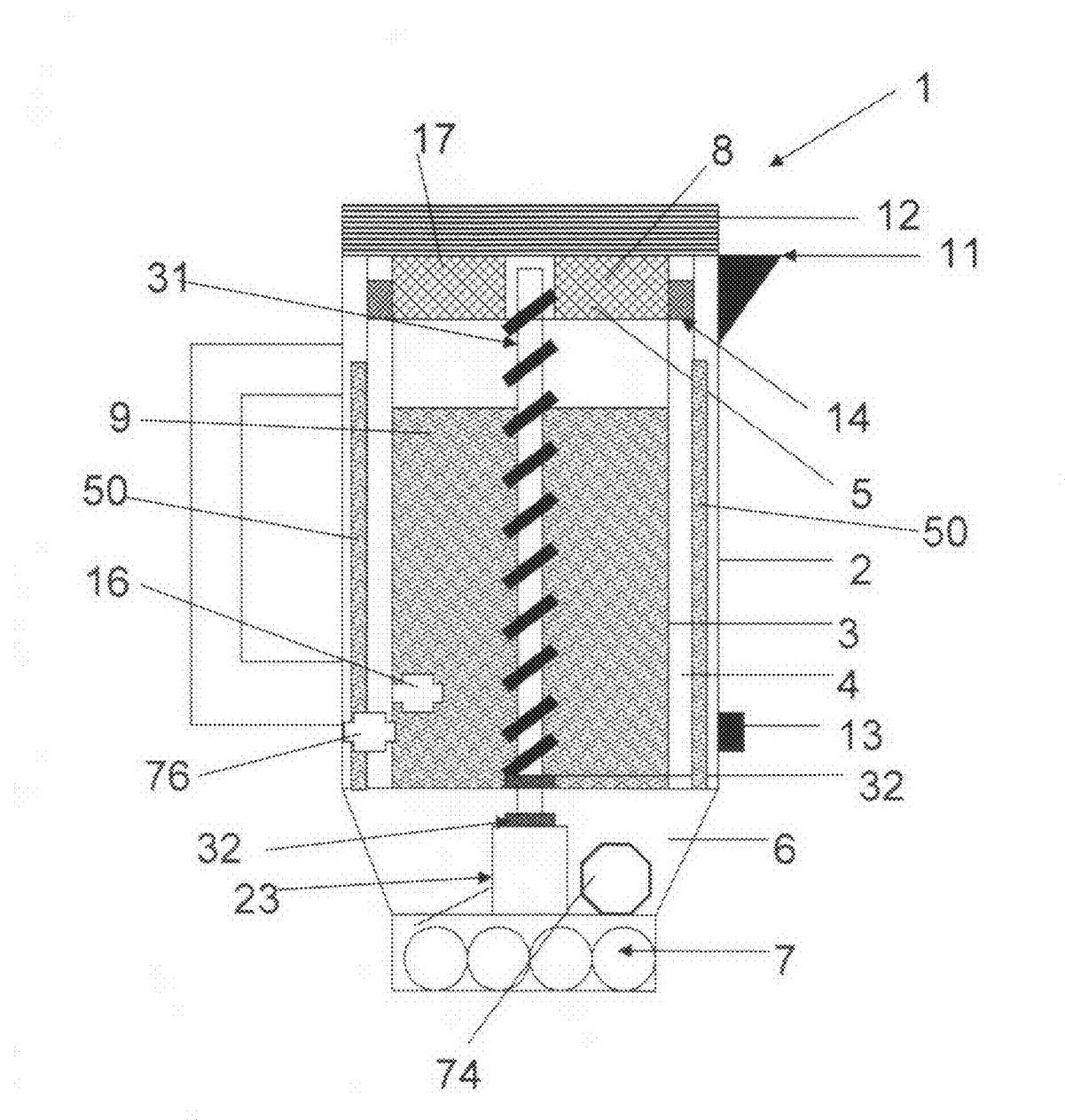
FIG. 10B is a cross sectional side view of the portable automatic beverage brewing drinking vessel having a flexible heating element, and a receptacle for receiving infusible material, an electric motor connected to a threaded center shaft to translate the receptacle into and out of the liquid.

FIGS. 10A and 10B are cross sectional side views of the portable automatic beverage brewing drinking vessel having a receptacle for receiving infusible material, and an electric motor 23 connected to a threaded center shaft 31 often referred to as a yankee screw, to translate the receptacle 5 through the liquid 9. The threaded center shaft 3, in FIG. 10A and FIG. 10B is connected directly or indirectly to the electric motor 23, and when the motor is activated, after the liquid reaches the preset temperature, turns the threaded center shaft that, through a connection with the receptacle 5, moves the receptacle down into the liquid 9. In this embodiment, a package of infusible material 17, as depicted in FIG. 6, may be used to allow the threaded center shaft to move through the receptacle. In addition, as shown in FIG. 10A and FIG. 10B, a seal 32 is placed between the base 6 of the portable automatic beverage brewing drinking vessel and the liquid containment portion of the portable automatic beverage brewing drinking vessel 1. FIG. 10A has a heating element 15 located below the liquid containment vessel or in the base, and FIG. 10B is depicted as having a flexible heating element 50 located outside of the interior wall of the drinking vessel 3. In one embodiment the flexible heating element is located on the outside surface of the wall containing the liquid, and in yet another embodiment, insulation is positioned between the flexible heating element and the interior side of the exterior wall of the drinking vessel. In one embodiment multiple flexible heating elements may be used.

Figure 11:
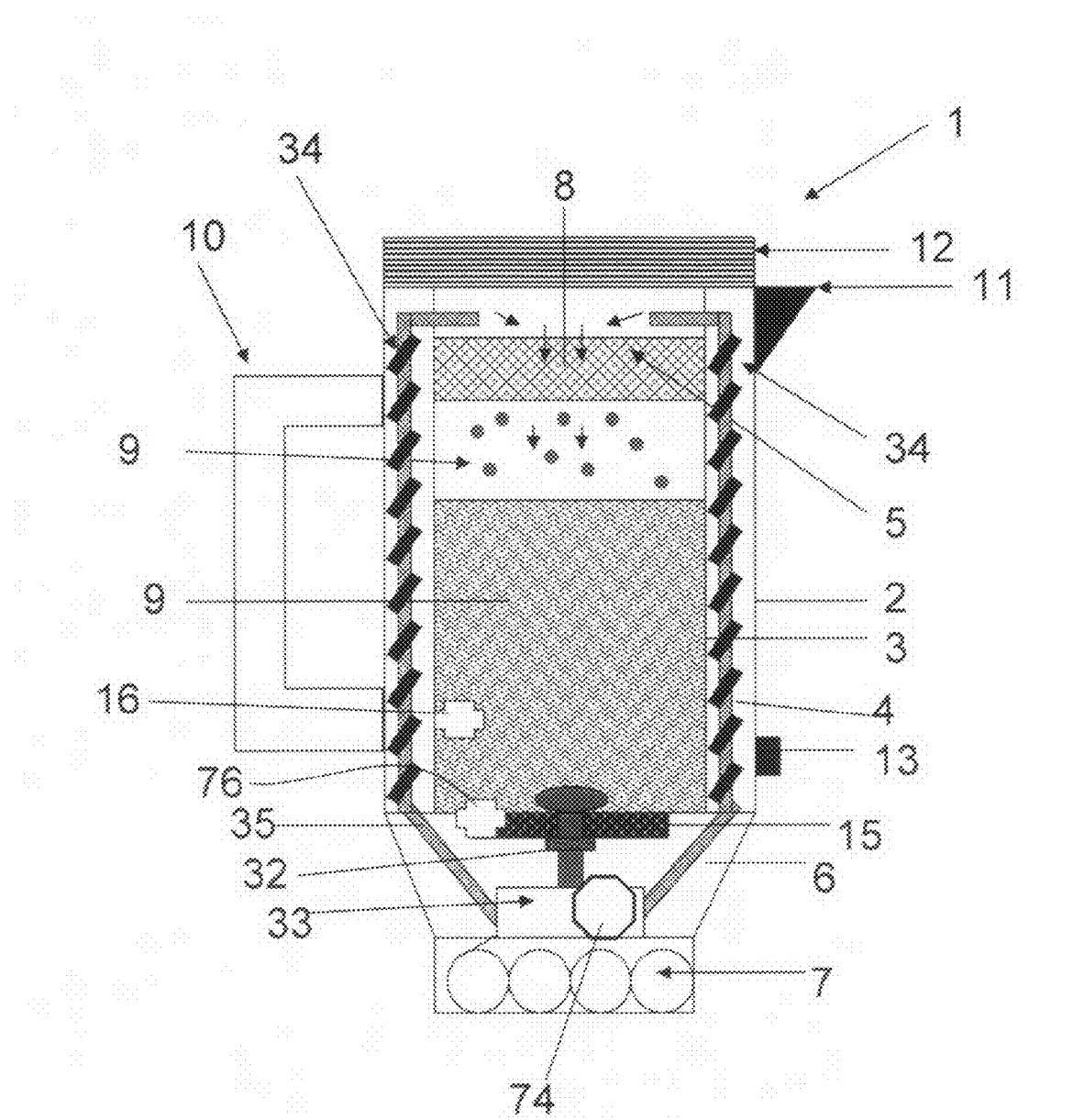
FIG. 11 is a cross sectional side view of the portable automatic beverage brewing drinking vessel having a receptacle for receiving infusible material, and pump to transfer liquid from the vessel through the infusible material.

FIG. 11 is a cross sectional side view of the portable automatic beverage brewing drinking vessel having a receptacle 5 for receiving infusible material 8, and pump 33 to transfer liquid from the lower portion of the vessel to the infusible material 8. In one embodiment, the liquid 9 may be heated as it is pumped up to the infusible material 8 by heating elements 34 as depicted in FIG. 9. In this embodiment, heating elements are used to heat the tubes which transfer the liquid. Additionally, a seal 32 or seals may be incorporated between the base 6, and the upper portion of the portable automatic beverage brewing drinking vessel, as depicted in FIG. 11.

Figure 13:
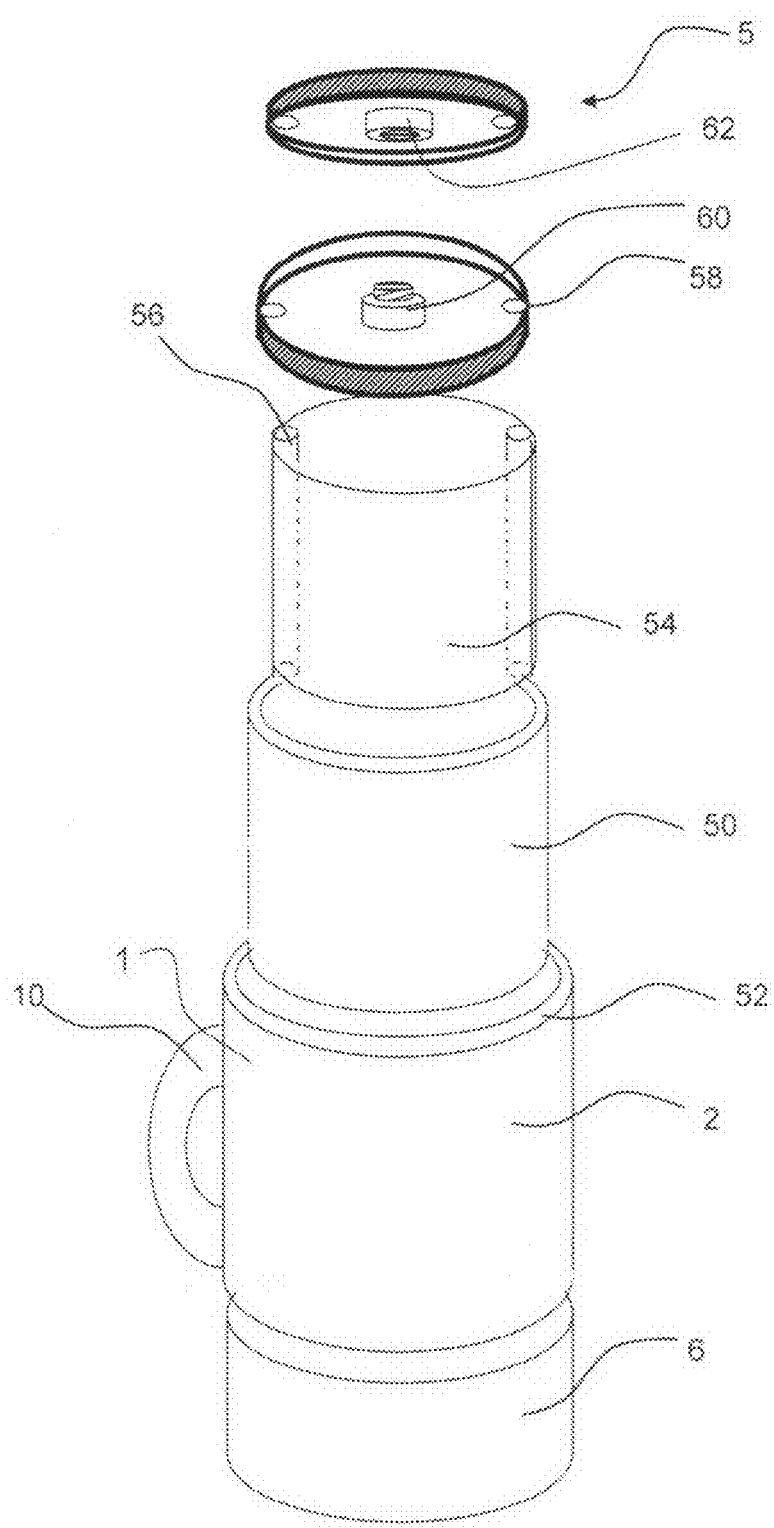
FIG. 13 is an isometric exploded view of a portable automatic beverage drinking vessel having a flexible heating element.

FIG. 13 is an isometric exploded view of one embodiment of the automatic beverage brewing drinking vessel where a flexible heating element 50 is positioned around the outer surface of the liquid container 54. As depicted in FIG. 13, insulation 52 such as foam, or felt, or aerogel composites, or any other suitable material, or air gaps defined by spacer elements between the outer wall 2 and flexible heating element 50 may be necessary to keep the outer wall 2 of the drinking vessel 1 from becoming too hot.

Figure 14A:
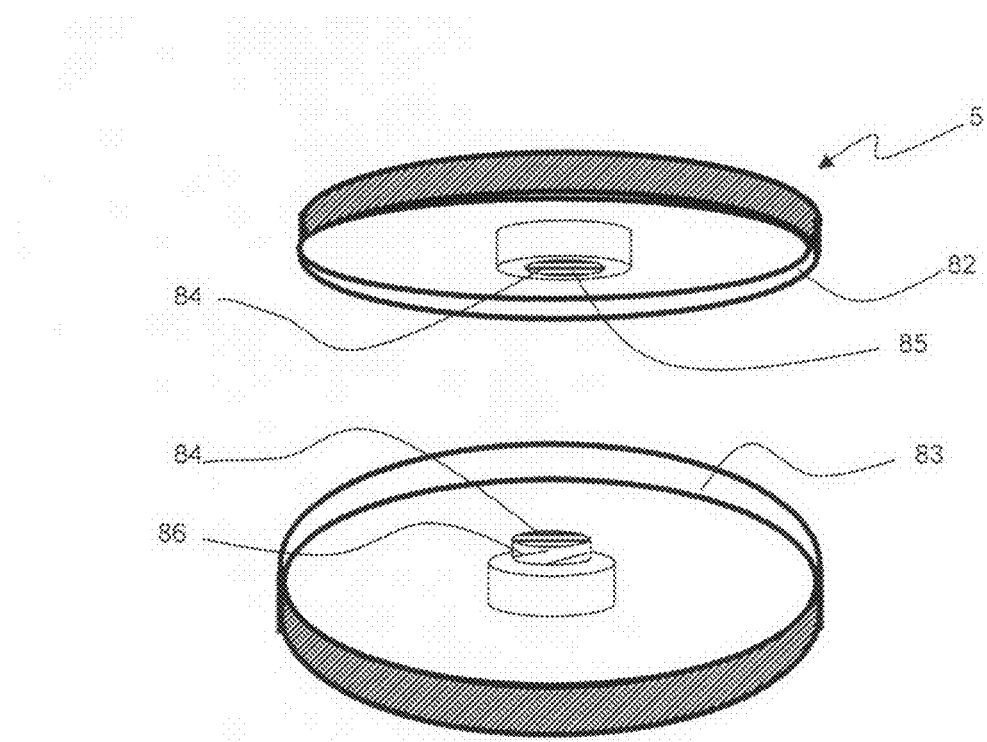
FIG. 14A is an isometric view depicting a receptacle for receiving infusible material.
Figure 14B:
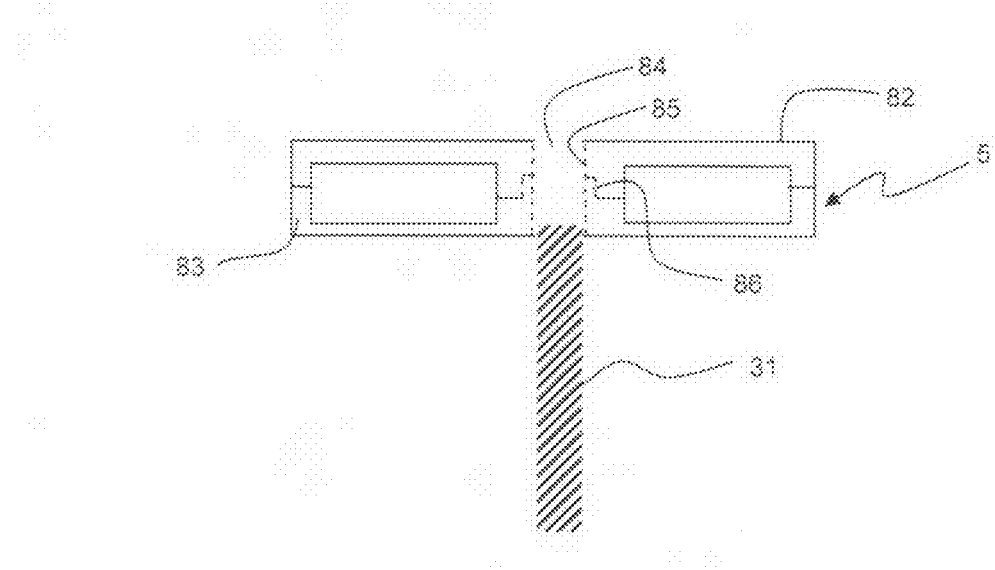
FIG. 14B is a cross sectional view depicting the receptacle of FIG. 14A and a threaded shaft.

FIG. 14A depicts one embodiment of receptacle 5 having a first piece 82 and a second piece 83 with coupling mechanism 86 and through-hole 84 having threads 85 for receiving a threaded center shaft. The two piece receptacle 5 depicted in FIG. 14A has a threaded coupling mechanism, however any type of mechanism that connects the two pieces for holding the infusible material would be sufficient, such as a snap fit, and the like. FIG. 14B is a cross-sectional depiction of the two piece receptacle 5 of FIG. 14A, having a through hole 84 with threads 85 for engaging with the center shaft 31.

Figure 15:
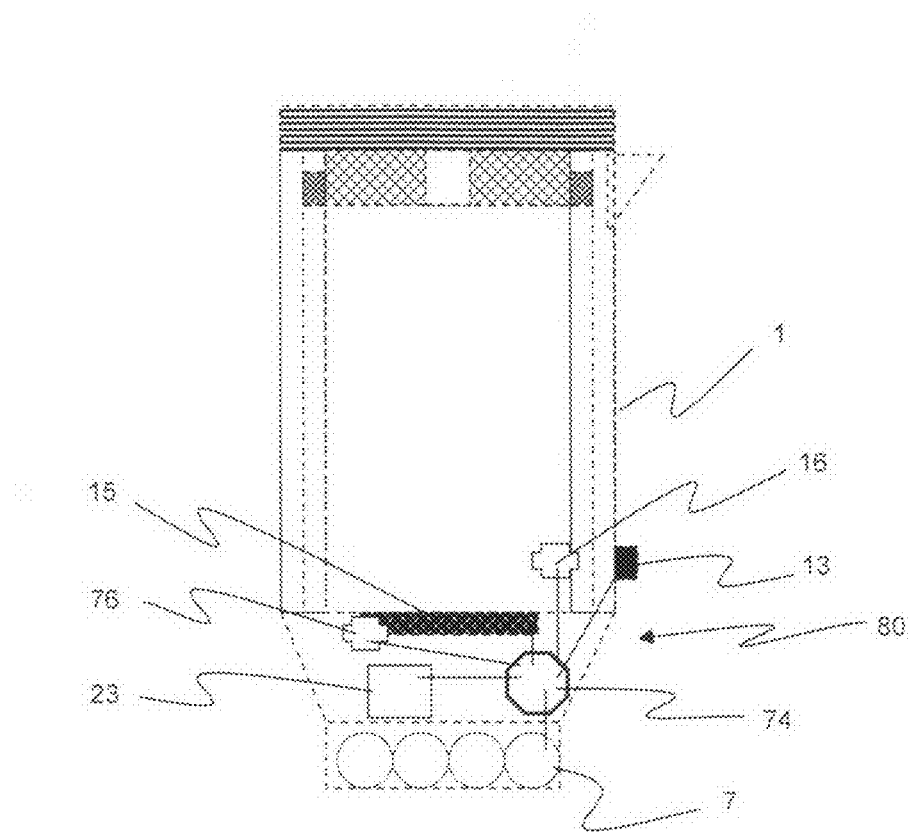
FIG. 15 is a cross sectional side view depicting the portable automatic beverage brewing drinking vessel having control logic.

The control logic of the present invention comprises a controller connected to a power source that receives input from sensors and activates or initiates the functional components, such as a heating element, electric motor or pump. The controller can be for example a microprocessor chip. The controller may also be indirectly connected to the other components for example; the controller may be connected to an electric switch, which is in turn connected to a component. FIG. 15, depicts one example of the control logic 80, having a controller 74 connected directly to the two temperature sensors, 16 and 76, an electric motor 23, a heating element 15, and a power supply 7.

Figure 16:
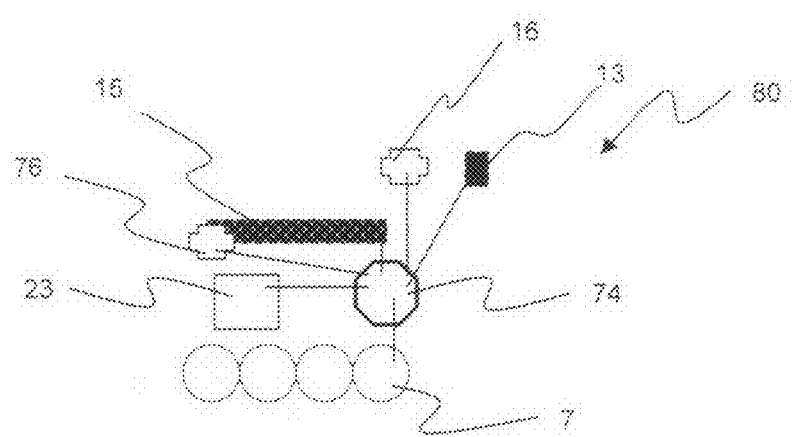
FIG. 16 is a schematic of one embodiment of the control logic.

FIG. 15 and FIG. 16 depict the control logic 80, and more specifically, the interconnections of components with the controller 74. FIG. 15, depicts one embodiment of the components in relation to the drinking vessel 1 and FIG. 16 more clearly shows how the components might be connected. The controller 74 is connected to the power source 7 and controls the operation of the automatic beverage brewing drinking vessel 1, including but no limited to receiving input from the on/off button 13, liquid temperature sensor 16, heating element temperature sensor 76, and controlling when components of the drinking vessel are activated including but not limited to the heating element 15, and motor 23, as depicted in FIGS. 15 and 16. The controller may be directly or indirectly connected with the input and output functions of the device. The drinking vessel is envisioned to be completely automatic, in that the user simply has to fill the vessel with liquid, such as water, load the infusible material, and press the "on" button, which activates the controller to begin the automatic brewing process.

In one embodiment, the portable automatic beverage brewing drinking vessel of the present invention is unitary, meaning that the vessel contains all parts and components necessary to brew a beverage and that the drinking vessel is not removed from any component, such as a heating element, and no component is removed from the drinking vessel during the brewing process, or before, or during consumption of the beverage directly from the vessel. The user simply has to insert the infusible material into the receptacle and activate the automatic beverage brewing drinking vessel to being brewing, and after the automatic brewing sequence is complete, the user may drink directly from the vessel. In one embodiment an electric cord may be connected to the automatic beverage brewing drinking vessel to charge the batteries or to supply power, and in this embodiment it may be more convenient for the user to remove the cord from the vessel prior to consuming the beverage.

DEFINITION OF TERMS

As used herein, the term automatic means that the portable automatic beverage brewing drinking vessel performs functions to brew the beverage without the intervention of the user. For example, the portable automatic beverage brewing drinking vessel heats the liquid to a predetermined temperature and translates the infusible material into the liquid.

As used herein, the term translating means that the receptacle for receiving infusible material moves for example up and down. Furthermore, when brewing the beverage, the receptacle is translated down and the liquid permeates through the receptacle causing the liquid to come in contact with the infusible material.

As used herein, the term portable means that the portable automatic beverage brewing drinking vessel can be easily carried, a beverage can be consumed directly there from, and in one embodiment, the power supply to operate the vessel is contained within the device housing.

As used herein, the term beverage means any beverage that a person may drink.

As used herein, the term brewing means extracting flavor from a material through the process of exposing the said material to liquid. For example, flavor is extracted from coffee, an infusible material, by exposing the coffee to liquid at elevated temperatures.

As used herein, the term heating element means an electrically powered resistive device that heats liquid to a predetermined temperature.

As used herein, the term drinking vessel means a container that is specifically design for the purpose of consuming a beverage directly from. In one embodiment the volume of the portable automatic beverage brewing drinking vessel is less than 0.75 liters, in another embodiment the volume is less than 0.5 liters and in yet another embodiment the volume is between 0.25 liters and 0.5 liters. In one embodiment, the lid 8 in FIG. 1 may be designed with a drinking port 11, such that the contents of the portable automatic beverage brewing drinking vessel 1 can be consumed through the drinking port 11. In another embodiment, the drinking port 11 as depicted in FIG. 8 through FIG. 11, allows the contents of the portable automatic beverage brewing drinking vessel to be consumed through the raised section on the side. As depicted in FIG. 1, the liquid container for has a volume for receiving liquid and can further be defined by a vertical axis 92. The receptacle may be moved down into the liquid some depth along this vertical axis. The depth may be defined as the distance along the vertical axis from the top portion of the liquid container, to some distance down from this position.

As used herein, the term base means the portion of the portable automatic beverage brewing drinking vessel below the liquid reservoir. In an embodiment, the moving mechanism is at least partially contained within the base along with a heating element, control logic, and portable electric power such as batteries or an electric port.

The portable automatic beverage brewing drinking vessel of the present invention is easily operated by filling the vessel to a desired level with water or other liquid and then placing a quantity of infusible material 8 into the into the receptacle 5, as depicted in FIG. 1 and FIG. 7 through FIG. 11. In one embodiment, the receptacle is designed to have two parts so that the infusible material can be easily placed into and restrained in the receptacle. In one embodiment, the receptacle 5 further comprises a hinge 40 as depicted in FIG. 12. In one embodiment, the infusible material is placed directly into the receptacle, and the receptacle is designed with a perforated material that will contain at least in part the infusible material throughout the brewing process. In a preferred embodiment the infusible material is in a pouch, and the pouch further contains the infusible material during brewing process. The pouch is advantageous because the quantity of infusible material is pre-measured and keeps the infusible material from spilling during loading and removal.

After the portable automatic beverage brewing drinking vessel 1 is filled to a desired level with water and the infusible material 8 is placed in the receptacle, the user simply has to activate the on/off switch 13, as depicted in FIG. 1 and FIG. 7 through FIG. 11. The portable automatic beverage brewing drinking vessel then heats the water to a preset temperature. In one embodiment, the liquid temperature is measured with a temperature sensor, and when the liquid reaches this preset temperature, the portable automatic beverage brewing drinking vessel automatically activates the lowering of the receptacle into the liquid. There are many different means for translating or lowering the receptacle into the liquid. In one embodiment, the means for moving the receptacle into the liquid is an electrical motor connected to wires that are connected to the receptacle. When activated, the motor is switched on to lower the receptacle into the liquid as depicted in FIG. 8. In another embodiment, the electric motor is connected to a threaded center shaft that will interact with receiving threads 85 on the receptacle 5, as depicted in FIG. 10A and FIG. 10B.

In another embodiment, the means for lowering the receptacle into the liquid is electromagnets as depicted in FIG. 9. In this embodiment, the electromagnets are positioned such that when activated, the magnets are attracted to each other and the receptacle is translated down through the liquid. In one embodiment, at least one electromagnet is connected to the receptacle, in another embodiment, the at least one electromagnet is located in the base, in yet another embodiment, an electromagnet is located in the base and a magnet is located in the receptacle.

In yet another embodiment, as depicted in FIG. 11, after the portable automatic beverage brewing drinking vessel 1 is filled and turned on, a pump is thereafter activated to transfers the liquid 9 through a tube 35 to the infusible material 8. The tube or conduit for transferring the liquid may be any conventional tube suitable of transferring liquid, such as but not limited to plastic or metal tubing. In one embodiment, the pump is activated after the liquid reaches a preset temperature. In another embodiment, the pump is activated after the portable automatic beverage brewing drinking vessel is turned on and the liquid is at least partially heated through heating elements placed in proximity to the liquid transfer tube.

Example

The portable automatic beverage brewing drinking vessel is first filled to a desired level with water. A pre-package pouch of ground coffee is placed in the receptacle and the lid is closed. The portable automatic beverage brewing drinking vessel is manually activated to the on position and this sends a signal to the controller, and the controller activates the heating element. The controller receives a signal from the liquid temperature sensor and also from the heating element sensor while the liquid is being heated. If the heating element becomes too hot, the controller will reduce or stop current to the heating element thereby reducing the chance for overheating. The temperature sensor monitors the temperature of the liquid and when it reaches the preset temperature, the control logic, and specifically the control, activates the motor to turn, which engages the threaded center shaft to lower the receptacle containing the coffee into the liquid. After a preset time the receptacle is automatically raised up within the vessel. The user in one embodiment can then remove the receptacle or the contents of the receptacle and drink the beverage directly from the portable automatic beverage brewing drinking vessel.

I claim:

1. A portable automatic beverage brewing device consisting of a unitary drinking vessel comprising a plurality of components including:
    a) a liquid container having an interior surface, an exterior surface, a vertical axis, a depth, and a volume;
    b) at least two guide channels extending at least a portion of the depth along the interior surface of the liquid container;
    c) a heating element;
    d) a receptacle for receiving infusible material configured in the top of the drinking vessel and configured to translate down and into said liquid container comprising:
        i. a plurality of guide elements configured to align with and couple with said at least two guide channels to guide said receptacle when said receptacle is translated down into said liquid container;
        ii. a threaded hole;
    e) liquid temperature sensor;
    f) a heating element temperature sensor;

g) a power supply;
h) an on/off button;
i) a controller;
j) a base configured under said liquid container;
k) an electric motor;
l) a threaded shaft extending from said base and up through said liquid container and into said threaded hole in said receptacle; and
m) a drinking port,
   wherein said plurality of components are attached to said drinking vessel,
   wherein the threaded shaft is centrally coupled to said electric motor and with said threaded hole in said receptacle, wherein said plurality of guide elements couple with said at least two guide channels to prevent said receptacle from turning when said threaded shaft turns within said threaded hole, whereby the electric motor turns the threaded shaft and said threaded shaft turns within said threaded hole to translate the receptacle into and out of a liquid within said liquid container, wherein said controller of the automatic beverage brewing device is configured to automatically translate the receptacle into and out of a liquid contained within the liquid container, thereby brewing a beverage for consumption directly from said portable and automatic beverage brewing device.

2. The portable and automatic beverage brewing device of claim 1, wherein the heating element is a flexible heating element and is positioned around at least a portion of the exterior surface of the liquid container.

3. The portable and automatic beverage brewing device of claim 1, wherein the power supply comprises batteries.

4. The portable and automatic beverage brewing device of claim 1, wherein the power supply comprises an electrical connection port.

5. The portable and automatic beverage brewing device of claim 1, wherein the receptacle can be detached from the unitary drinking vessel.

6. The portable and automatic beverage brewing device of claim 1, wherein the infusible material is coffee.

7. The portable and automatic beverage brewing device of claim 1, wherein the volume of the liquid container is no more than 24 ounces.

8. The portable and automatic beverage brewing device of claim 1, wherein the volume of the liquid container is no more than 12 ounces.

9. A portable and automatic beverage brewing device comprising a unitary drinking vessel comprising a plurality of components including:
   a) a liquid container having an interior surface, an exterior surface, a vertical axis, a depth, and a volume;
   b) at least two guide channels extending at least a portion of the depth along the interior surface of the liquid container;
   c) a heating element;
   d) a receptacle for receiving infusible material configured in the top of the drinking vessel comprising a plurality of guide elements configured to align with and fit within the at least two guide channels to guide said receptacle when said receptacle is translated down and into said liquid container;
   e) liquid temperature sensor;
   f) a heating element temperature sensor;
   g) a power supply;
   h) an on/off button;
   i) a controller;
   j) a timing device;
   k) a base;
   l) a drinking port; and
   m) at least one electromagnet configured in said base,
      wherein said plurality of components are attached to said drinking vessel,
      wherein the at least one electromagnet is configured to translate the receptacle into and out of a liquid contained within the liquid container, whereby the at least one electromagnet configured in said base is activated by said timing device and attracts the receptacle, and whereby said at least one electromagnet is configured to be stationary, thereby brewing a beverage for consumption directly from the vessel.

10. The portable and automatic beverage brewing device of claim 9, wherein the receptacle for receiving infusible material comprises a magnet coupled thereto, whereby said magnet is attracted to the at least one electromagnet.

11. A portable automatic beverage brewing device consisting of a unitary drinking vessel comprising a plurality of components including:
   a) a liquid container having an interior surface, an exterior surface, a vertical axis, a depth, and a volume;
   b) at least two liquid container guide elements extending out and into said liquid container and along at least a portion of the depth along the interior surface of the liquid container;
   c) a heating element;
   d) a receptacle for receiving infusible material configured in the top of the drinking vessel and configured to translate down and into said liquid container comprising:
      i. a plurality of receptacle guide elements configured to align with and couple with said at least two guide elements of said liquid container to guide said receptacle when said receptacle is translated down into said liquid container;
      ii. a threaded hole;
   e) liquid temperature sensor;
   f) a heating element temperature sensor;
   g) a power supply;
   h) an on/off button;
   i) a controller;
   j) a base configured under said liquid container;
   k) an electric motor;
   l) a threaded shaft extending from said base and up through said liquid container and into said threaded hole in said receptacle; and
   m) a drinking port,
      wherein said plurality of components are attached to said drinking vessel,
      wherein the threaded shaft is centrally coupled to said electric motor and with said threaded hole in said receptacle, wherein said plurality of said receptacle guide elements couple with said at least two liquid container guide elements to prevent the receptacle from turning when said threaded shaft turns within said threaded hole, whereby the electric motor turns the threaded shaft and said threaded shaft turns within said threaded hole to translate the receptacle into and out of a liquid within said liquid container, wherein said controller of the automatic beverage brewing device is configured to automatically translate the receptacle into and out of a liquid contained within the liquid container, thereby brewing a beverage for consumption directly from said portable and automatic beverage brewing device.

* * * * *